US011929037B2

(12) United States Patent
Hong et al.

(10) Patent No.: US 11,929,037 B2
(45) Date of Patent: Mar. 12, 2024

(54) DISPLAY DEVICE INCLUDING MULTIPLEXER AND METHOD OF DRIVING THE SAME

(71) Applicant: LG DISPLAY CO., LTD., Seoul (KR)

(72) Inventors: Soon-Hwan Hong, Paju-si (KR); Dae-Seok Oh, Paju-si (KR); Seong-Yeong Kim, Paju-si (KR); Kyung-Ah Chin, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 72 days.

(21) Appl. No.: 17/558,549

(22) Filed: Dec. 21, 2021

(65) Prior Publication Data

US 2022/0208125 A1 Jun. 30, 2022

(30) Foreign Application Priority Data

Dec. 29, 2020 (KR) ........................ 10-2020-0186107

(51) Int. Cl.

*G09G 3/3291* (2016.01)
*G09G 3/20* (2006.01)

(52) U.S. Cl.

CPC ......... *G09G 3/3291* (2013.01); *G09G 3/2003* (2013.01); *G09G 2300/0452* (2013.01); *G09G 2310/0291* (2013.01); *G09G 2310/0297* (2013.01); *G09G 2310/08* (2013.01)

(58) Field of Classification Search

None

See application file for complete search history.

(56) References Cited

U.S. PATENT DOCUMENTS 10,839,754 B2 * 11/2020 Kim ..................... G09G 3/3291
2009/0273593 A1 * 11/2009 Tonogai ............... G09G 3/3688 345/55
2013/0021229 A1 * 1/2013 Ludden ................ G09G 3/3688 345/89
2016/0042695 A1 * 2/2016 Park ..................... G09G 3/3648 345/690
2016/0322008 A1 * 11/2016 Sang .................... G09G 3/3688
2018/0151137 A1 * 5/2018 Lee ...................... G09G 3/3677
2018/0151145 A1 * 5/2018 Lee ........................... G09G 5/02
2022/0059014 A1 * 2/2022 Kuo ...................... H01L 27/156
2023/0113898 A1 * 4/2023 Kim ..................... G09G 3/2092 345/211

FOREIGN PATENT DOCUMENTS

CN 105810144 A 7/2016
KR 10-2016-0130028 A 11/2016

OTHER PUBLICATIONS

Chinese Office Action dated Dec. 29, 2023 issued in Patent Application No. 202111588750.1 w/English Translation (14 pages).

* cited by examiner

*Primary Examiner* — Kenneth Bukowski
(74) *Attorney, Agent, or Firm* — POLSINELLI PC

(57) ABSTRACT

A display device includes a timing controlling part generating an image data, a data control signal and a gate control signal; a data driving part generating a data voltage using the image data and the data control signal; a gate driving part generating a gate voltage using the gate control signal; a display panel including a plurality of subpixels and displaying an image using the data voltage and the gate voltage; and a plurality of first MUX switches and a plurality of second MUX switches sequentially transmitting the data voltage to two of a same color among the plurality of subpixels.

13 Claims, 14 Drawing Sheets

DISPLAY DEVICE INCLUDING MULTIPLEXER AND METHOD OF DRIVING THE SAME

CROSS-REFERENCE TO RELATED APPLICATION

The present application claims the priority of Korean Patent Application No. 10-2020-0186107 filed on Dec. 29, 2020, which is hereby incorporated by reference in its entirety.

BACKGROUND

Field of the Disclosure

The present disclosure relates to a display device, and more particularly, to a display device including a multiplexer where a data voltage of one output terminal of a data driving part is supplied to two subpixels of a same color using a multiplexer and a method of driving the display device.

Description of the Background

As the information age progresses, display devices have rapidly advanced. In a display device field, a conventional cathode ray tube (CRT) has been rapidly replaced by a flat panel display (FPD) device having a thin profile, a light weight and a low power consumption. The FPD device includes a liquid crystal display (LCD) device, a plasma display panel (PDP), an organic light emitting display (OLED) device and a field emission display (FED) device.

The display device displays an image by supplying a data voltage outputted from a data driving part to a pixel of a display panel. As a resolution increases, a number of pixels increases. Since a number of output terminals of the data driving part increases, a size and a number of the data driving part increase and a fabrication cost of the display device increases.

When the display panel is applied to a touch display device, a volume of the touch display device increases due to an additional driving part for touch sensing. Specifically, it is hard to obtain a flexible touch display device due to an additional touch driving part and an additional display driving part.

SUMMARY

Accordingly, the present disclosure is directed to a display device that substantially obviates one or more of the problems due to limitations and disadvantages as described above.

More specifically, the present disclosure is to provide a display device including a multiplexer where a number of digital analog converters decreases, a size and a number of data driving parts and a fabrication cost is reduced and a method of driving the display device.

The present disclosure is also to provide a display device including a multiplexer where a luminance deviation is reduced and deterioration such as a vertical line stain is prevented and a method of driving the display device.

Further, the present disclosure is to provide a display device including a multiplexer where a luminance uniformity is improved, an optical compensation is optimized and a power consumption is reduced and a method of driving the display device.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display device includes: a timing controlling part generating an image data, a data control signal and a gate control signal; a data driving part generating a data voltage using the image data and the data control signal; a gate driving part generating a gate voltage using the gate control signal; a display panel including a plurality of subpixels and displaying an image using the data voltage and the gate voltage; and a plurality of first MUX switches and a plurality of second MUX switches sequentially transmitting the data voltage to two of a same color among the plurality of subpixels.

In another aspect, a method of driving a display device includes: generating an image data, a data control signal and a gate control signal; generating a data voltage using the image data and the data control signal; generating a gate voltage using the gate control signal; sequentially transmitting the data voltage to two of a same color among the plurality of subpixels through a plurality of first MUX switches and a plurality of second MUX switches; and displaying an image using the data voltage and the gate voltage.

It is to be understood that both the foregoing general description and the following detailed description are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the present disclosure, illustrate aspects of the disclosure and together with the description serve to explain the principles of the disclosure.

In the drawings.

DETAILED DESCRIPTION

Figure 1:
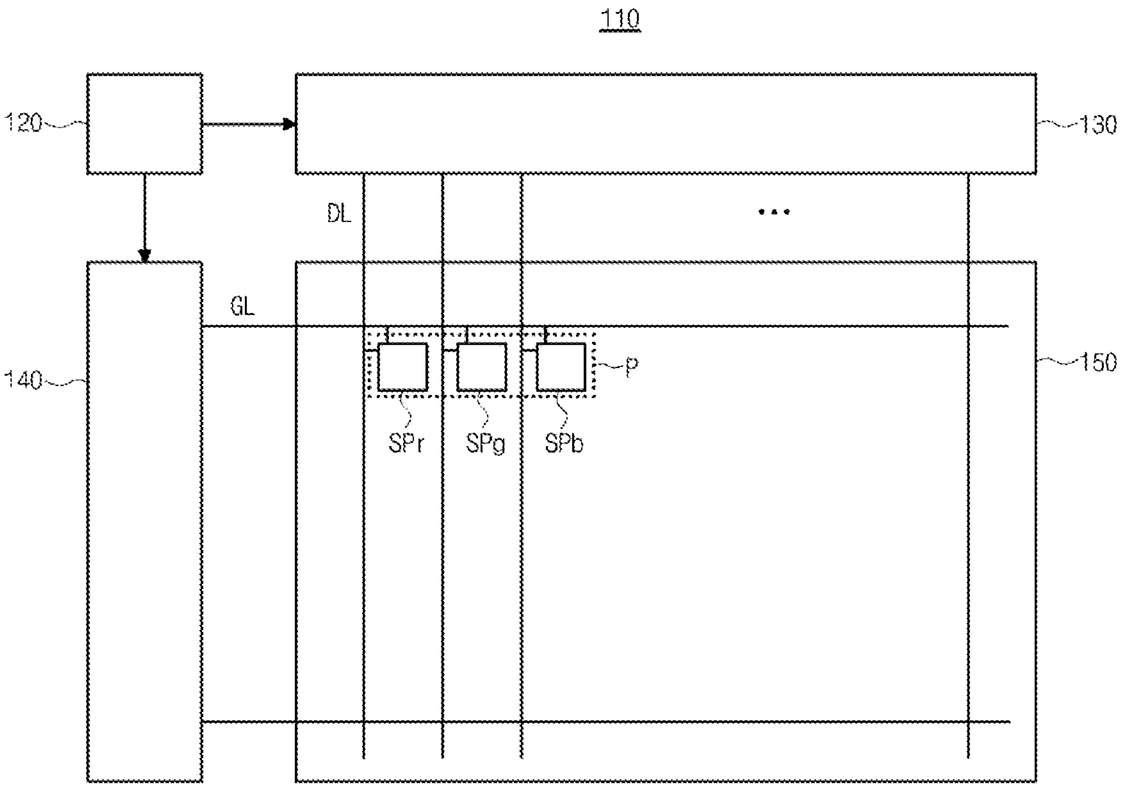
FIG. 1 is a view showing a display device according to a first aspect of the present disclosure.

Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing aspects of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Features of various aspects of the present disclosure may be partially or overall coupled to or combined with each other, and may be variously inter-operated with each other and driven technically as those skilled in the art can sufficiently understand. Aspects of the present disclosure may be carried out independently from each other, or may be carried out together in co-dependent relationship.

Hereinafter, a touch display device according to aspects of the present disclosure will be described in detail with reference to the accompanying drawings. In the following description, same reference numerals designate same elements throughout. When a detailed description of well-known functions or configurations related to this document is determined to unnecessarily cloud a gist of the inventive concept, the detailed description thereof will be omitted or will be made brief.

FIG. 1 is a view showing a display device according to a first aspect of the present disclosure. The display device may include an organic light emitting diode (OLED) display device.

In FIG. 1, a display device 110 according to a first aspect of the present disclosure includes a timing controlling part 120, a data driving part 130, a gate driving part 140 and a display panel 150.

The timing controlling part 120 generates an image data, a data control signal and a gate control signal using an image signal and a plurality of timing signals such as a data enable signal, a horizontal synchronization signal, a vertical synchronization signal and a clock transmitted from an external system (not shown) such as a graphic card or a television system. The timing controlling part 120 transmits the image data and the data control signal to the data driving part 130 and transmits the gate control signal to the gate driving part 140.

The data driving part 130 generates a data voltage (a data signal) using the data control signal and the image data transmitted from the timing controlling part 120 and applies the data voltage to a data line DL of the display panel 150.

The gate driving part 140 generates a gate voltage (a gate signal) using the gate control signal transmitted from the timing controlling part 120 and applies the gate voltage to a gate line GL of the display panel 150.

The gate driving part 140 may have a gate-in-panel (GIP) type where the gate driving part 140 is disposed on a substrate of the display panel 150 having the gate line GL, the data line DL and a pixel P.

The display panel 150 displays an image using the gate voltage and the data voltage and includes a plurality of pixels P, a plurality of gate lines GL and a plurality of data lines DL.

Each of the plurality of pixels P includes red, green and blue subpixels SPr, SPg and SPb. The gate line GL and the data line DL cross each other to define the red, green and blue subpixels SPr, SPg and SPb, and each of the red, green and blue subpixels SPr, SPg and SPb is connected to the gate line GL and the data line DL.

When the display device 110 is an OLED display device, each of the red, green and blue subpixels SPr, SPg and SPb may include a plurality of thin film transistors (TFTs) such as a switching TFT, a driving TFT and a sensing TFT, a storage capacitor and a light emitting diode.

Each subpixel of the display panel 150 will be illustrated with reference to drawings.

Figure 2:
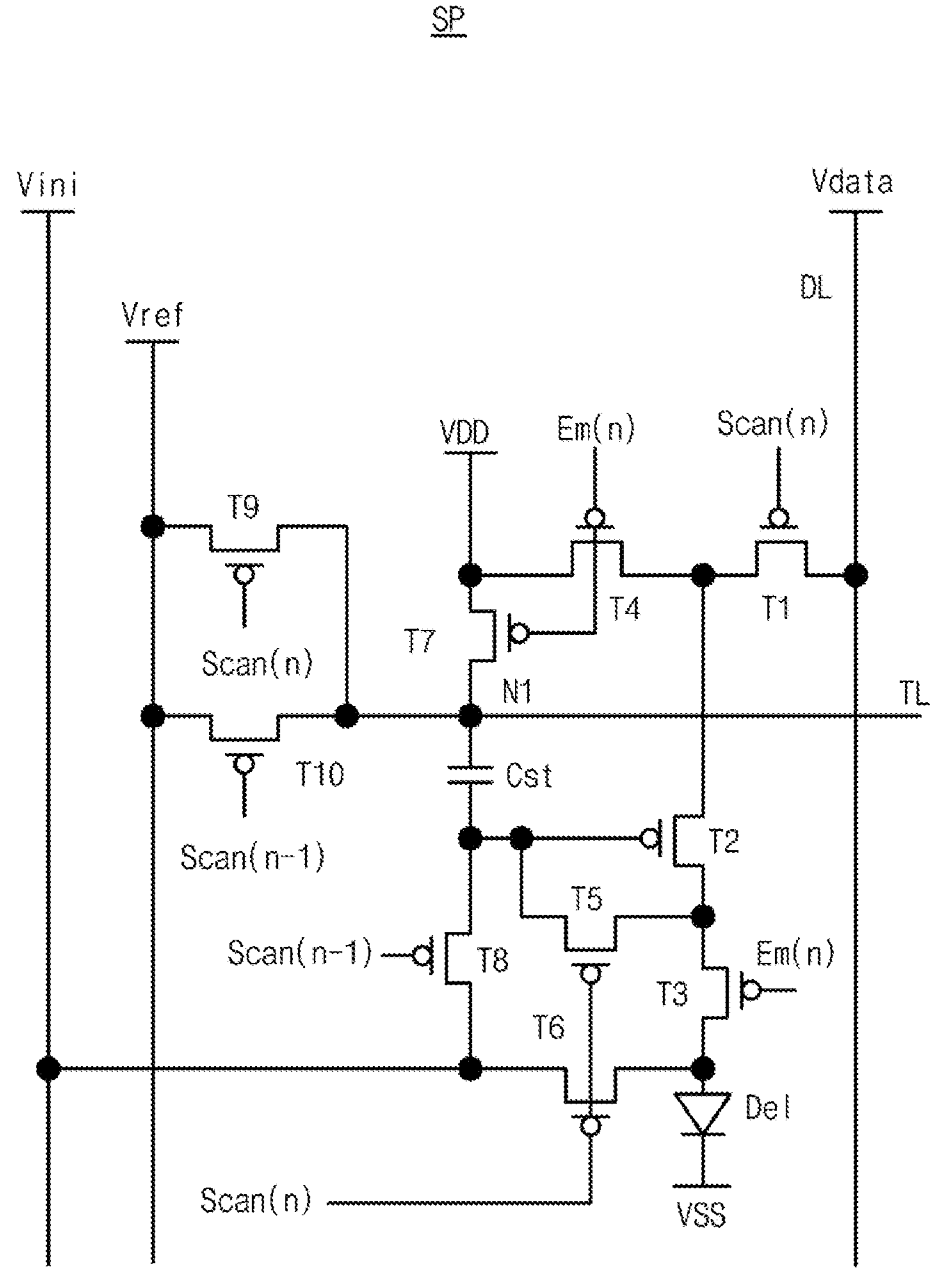
FIG. 2 is a view showing a subpixel of a display device according to a first aspect of the present disclosure.

FIG. 2 is a view showing a subpixel of a display device according to a first aspect of the present disclosure.

In FIG. 2, each of the red, green and blue subpixels SPr, SPg and SPb of the display panel 150 of the display device 110 according to a first aspect of the present disclosure includes first to tenth transistors T1 to T10, a storage capacitor Cst and a light emitting diode Del.

For example, the first to tenth transistors T1 to T10 may have a positive (P) type.

The first transistor T1 as a switching transistor may be switched according to an (n)th gate voltage Scan(n) to transmit a data voltage Vdata. A gate electrode of the first transistor T1 receives the (n)th gate voltage Scan(n) of an (n)th gate line, a source electrode of the first transistor T1 is connected to a data line DL, and a drain electrode of the first transistor T1 is connected to source electrodes of the second and fourth transistors T2 and T4.

The second transistor T2 as a driving transistor may be switched according to a voltage of a first electrode of the storage capacitor Cst. A gate electrode of the second transistor T2 is connected to the first electrode of the storage capacitor Cst, a drain electrode of the fifth transistor T5 and a source electrode of the eighth transistor T8, a source electrode of the second transistor T2 is connected to a drain electrode of the first transistor T1 and a source electrode of the fourth transistor T4, and a drain electrode of the second transistor T2 is connected to source electrodes of the third and fifth transistors T3 and T5.

The third transistor T3 may be switched according to an (n)th emission voltage Em(n). A gate electrode of the third transistor T3 receives the (n)th emission voltage Em(n), a source electrode of the third transistor T3 is connected to a drain electrode of the second transistor T2 and a source electrode of the fifth transistor T5, and a drain electrode of the third transistor T3 is connected to a source electrode of the sixth transistor T6 and an anode of the light emitting diode Del.

The fourth transistor T4 may be switched according to an (n)th emission voltage Em(n). A gate electrode of the fourth transistor T4 receives the (n)th emission voltage Em(n), a source electrode of the fourth transistor T4 is connected to a drain electrode of the first transistor T1 and a source electrode of the second transistor T2, and a drain electrode of the fourth transistor T4 receives a high level voltage VDD and is connected to a source electrode of the seventh transistor T7.

The fifth transistor T5 may be switched according to an (n)th gate voltage Scan(n). A gate electrode of the fifth transistor T5 receives the (n)th gate voltage Scan(n), a source electrode of the fifth transistor T5 is connected to a drain electrode of the second transistor T2 and a source electrode of the third transistor T3, and a drain electrode of the fifth transistor T5 is connected to a gate electrode of the second transistor T2, a first electrode of the storage capacitor Cst and a source electrode of the eighth transistor T8.

The sixth transistor T6 may be switched according to an (n)th gate voltage Scan(n). A gate electrode of the sixth transistor T6 receives the (n)th gate voltage Scan(n), a source electrode of the sixth transistor T6 is connected to a drain electrode of the third transistor T3 and an anode of the light emitting diode Del, and a drain electrode of the sixth transistor T6 receives an initialization voltage Vini and is connected to a drain electrode of the eighth transistor T8.

The seventh transistor T7 may be switched according to an (n)th emission voltage Em(n). A gate electrode of the seventh transistor T7 receives the (n)th emission voltage Em(n), a source electrode of the seventh transistor T7 receives a high level voltage VDD, and a drain electrode of the seventh transistor T7 is connected to a second electrode of the storage capacitor Cst and source electrodes of the ninth and tenth transistors T9 and T10.

The eighth transistor T8 may be switched according to an (n−1)th gate voltage Scan(n−1). A gate electrode of the eighth transistor T8 receives the (n−1)th gate voltage Scan (n−1), a source electrode of the eighth transistor T8 is connected to a first electrode of the storage capacitor Cst, a gate electrode of the second transistor T2 and a drain electrode of the fifth transistor T5, and a drain electrode of the eighth transistor T8 receives an initialization voltage Vini and is connected to a drain electrode of the sixth transistor T6.

The ninth transistor T9 may be switched according to an (n)th gate voltage Scan(n). A gate electrode of the ninth transistor T9 receives the (n)th gate voltage Scan(n), a source electrode of the ninth transistor T9 is connected to a second electrode of the storage capacitor Cst and a drain electrode of the seventh transistor T7, and a drain electrode of the ninth transistor T9 receives a reference voltage Vref.

The tenth transistor T10 may be switched according to an (n−1)th gate voltage Scan(n−1). A gate electrode of the tenth transistor T10 receives the (n−1)th gate voltage Scan(n−1), a source electrode of the tenth transistor T10 is connected to a second electrode of the storage capacitor Cst and a drain electrode of the seventh transistor T7, and a drain electrode of the tenth transistor T10 receives a reference voltage Vref.

The light emitting diode Del is connected between the third transistor T3 and a low level voltage VSS and emits a light of a luminance proportional to a current of the second transistor T2.

The light emitting diode Del emits the light according to operation of the first to tenth transistors T1 to T10 and the storage capacitor Cst to display an image. In addition, the display device 110 may compensate variation of a threshold voltage or deterioration of the light emitting diode according to a duration time using the subpixel. In addition, the display device 110 may control a luminance by driving the light emitting diode Del according to a duty ratio corresponding to an emission time.

The data driving part and the display panel of the display device 110 will be illustrated with reference to drawings.

Figure 3:
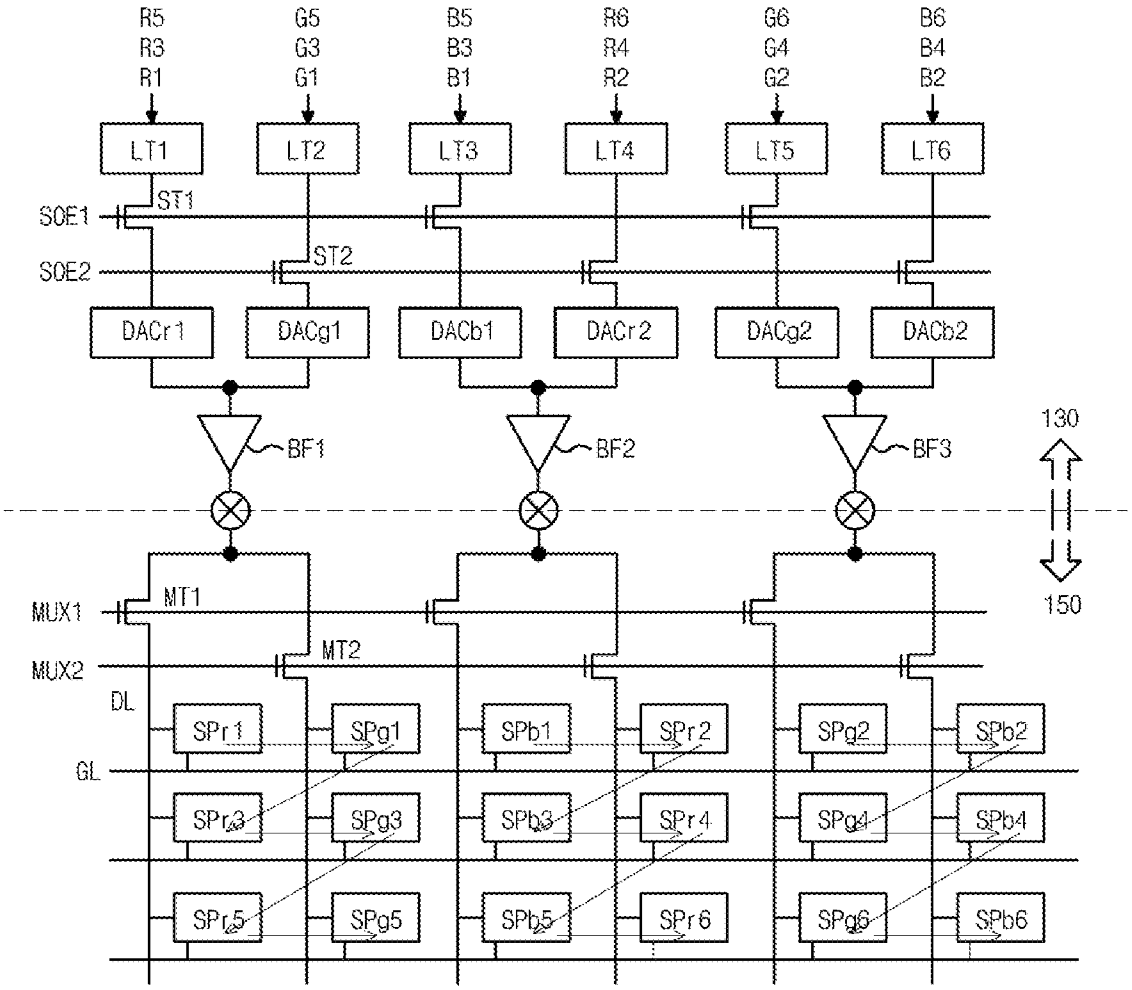
FIG. 3 is a view showing a data driving part and a display panel of a display device according to a first aspect of the present disclosure.
Figure 4:
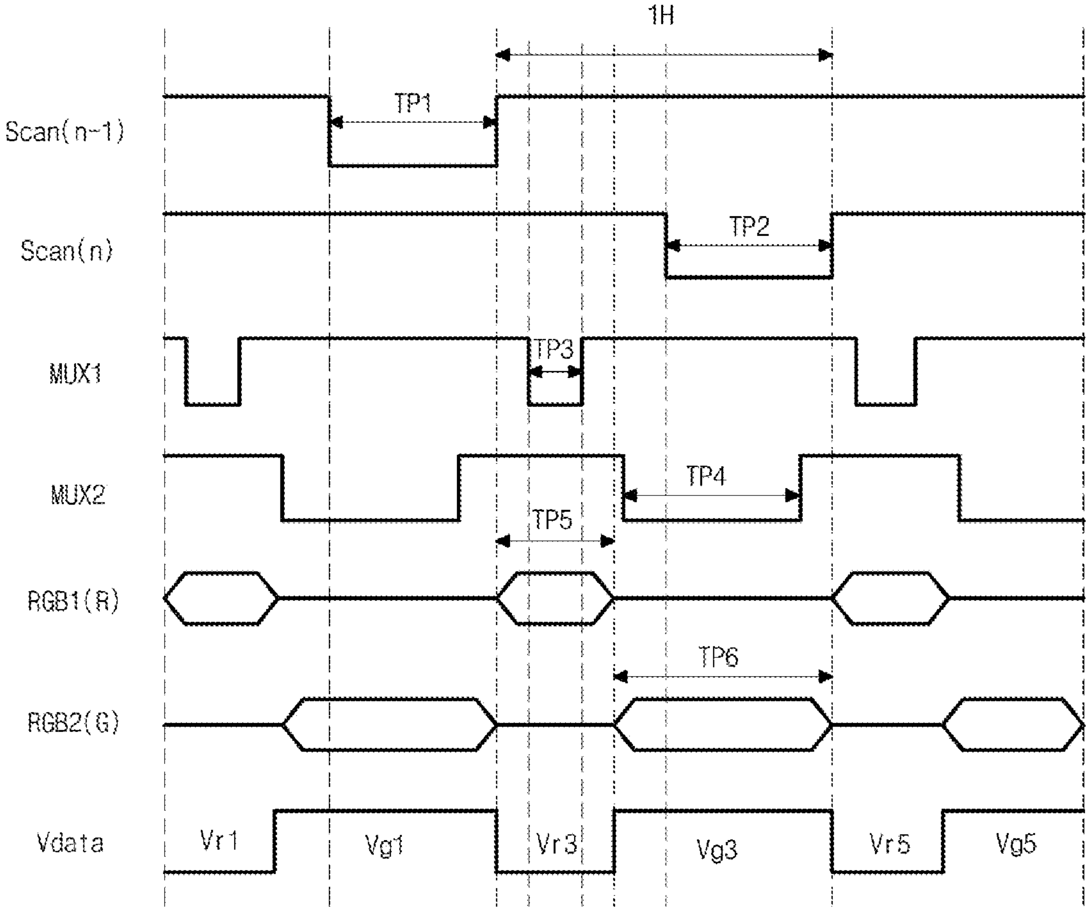
FIG. 4 is a view showing a plurality of signals of a data driving part and a display panel of a display device according to a first aspect of the present disclosure.
Figure 5:
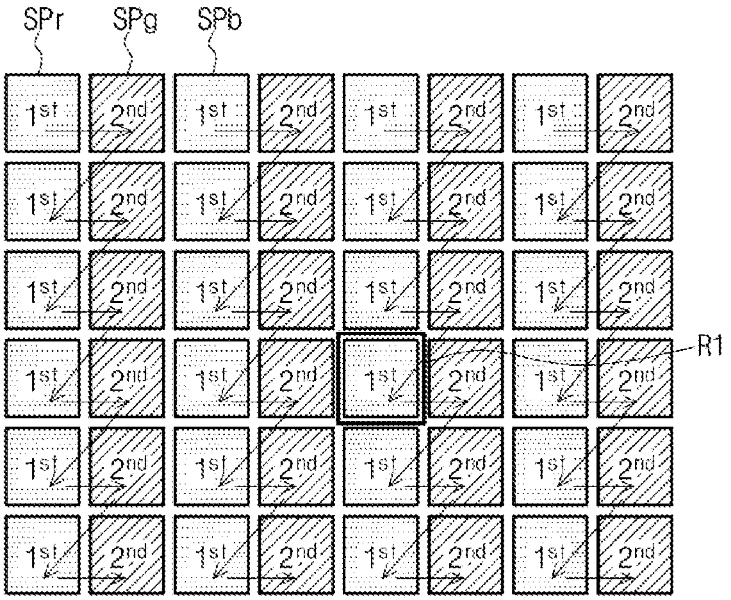
FIG. 5 is a view showing a supply sequence of a data voltage to a plurality of subpixels of a display device according to a first aspect of the present disclosure.

FIG. 3 is a view showing a data driving part and a display panel of a display device according to a first aspect of the present disclosure, FIG. 4 is a view showing a plurality of signals of a data driving part and a display panel of a display device according to a first aspect of the present disclosure, and FIG. 5 is a view showing a supply sequence of a data voltage to a plurality of subpixels of a display device according to a first aspect of the present disclosure.

In FIG. 3, the data driving part 130 of the display device 110 according to a first aspect of the present disclosure may include a plurality of latches LT1 to LT6, a plurality of first source switches ST1, a plurality of second source switches ST2, a plurality of red digital analog converters DACr1 and DACr2, a plurality of green digital analog converters DACg1 and DACg2, a plurality of blue digital analog converters DACb1 and DACb2 and a plurality of buffers BF1, BF2 and BF3. The display panel 150 of the display device 110 according to a first aspect of the present disclosure may include a plurality of first MUX switches MT1, a plurality of second MUX switches MT2, a plurality of red subpixels SPr, a plurality of green subpixels SPg and a plurality of blue subpixels SPb.

The data driving part 130 may be connected to a non-display area surrounding a display area of the display panel 150. The plurality of first MUX switches MT1 and the plurality of second MUX switches MT2 may be disposed in the non-display area of the display panel 150.

The plurality of latches LT1 to LT6 sequentially receive image data of each color from the timing controlling part 120 and store the image data of each color for a time corresponding to one clock. Next, the plurality of latches LT1 to LT6 sequentially output the image data of each color to the plurality of red digital analog converters DACr1 and DACr2, the plurality of green digital analog converters DACg1 and DACg2 and the plurality of blue digital analog converters DACb1 and DACb2 through the plurality of first source switches ST1 and the plurality of second source switches ST2.

For example, first red, third red and fifth red image data R1, R3 and R5 may be sequentially inputted to and sequentially outputted from the first latch LT1, first green, third green and fifth green image data G1, G3 and G5 may be sequentially inputted to and sequentially outputted from the second latch LT2, and first blue, third blue and fifth blue image data B1, B3 and B5 may be sequentially inputted to and sequentially outputted from the third latch LT3. Second red, fourth red and sixth red image data R2, R4 and R6 may be sequentially inputted to and sequentially outputted from the fourth latch LT4, second green, fourth green and sixth green image data G2, G4 and G6 may be sequentially inputted to and sequentially outputted from the fifth latch LT5, and second blue, fourth blue and sixth blue image data B2, B4 and B6 may be sequentially inputted to and sequentially outputted from the sixth latch LT6.

The plurality of first source switches ST1 and the plurality of second source switches ST2 sequentially transmit the image data of each color outputted from the adjacent latches LT1 to LT6 to the plurality of red digital analog converters DACr1 and DACr2, the plurality of green digital analog converters DACg1 and DACg2 and the plurality of blue digital analog converters DACb1 and DACb2 at different timings according to first and second source enable signals SOE1 and SOE2.

For example, according to the first source enable signal SOE1, the plurality of first source switches ST1 may sequentially transmit the first red, third red and fifth red image data R1, R3 and R5 of the first latch LT1 to the first red digital analog converter DACr1, may sequentially transmit the first blue, third blue and fifth blue image data B1, B3 and B5 of the third latch LT3 to the first blue digital analog converter DACb1, and may sequentially transmit the second green, fourth green and sixth green image data G2, G4 and G6 of the fifth latch LT5 to the second green digital analog converter DACg2.

According to the second source enable signal SOE2, the plurality of second source switches ST2 may sequentially transmit the first green, third green and fifth green image data G1, G3 and G5 of the second latch LT2 to the first green digital analog converter DACg1, may sequentially transmit the second red, fourth red and sixth red image data R2, R4 and R6 of the fourth latch LT4 to the second red digital analog converter DACr2, and may sequentially transmit the second blue, fourth blue and sixth blue image data B2, B4 and B6 of the sixth latch LT6 to the second blue digital analog converter DACb2.

The plurality of red digital analog converters DACr1 and DACr2, the plurality of green digital analog converters DACg1 and DACg2 and the plurality of blue digital analog converters DACb1 and DACb2 convert the image data inputted from the plurality of latches LT1 to LT6 into a data voltage and sequentially output the data voltage.

For example, the first red digital analog converter DACr1 may convert the first red, third red and fifth red image data R1, R3 and R5 of the first latch LT1 into first red, third red and fifth red data voltages Vr1, Vr3 and Vr5 and may transmit the first red, third red and fifth red data voltages Vr1, Vr3 and Vr5 to the first buffer BF1. The first green digital analog converter DACg1 may convert the first green, third green and fifth green image data G1, G3 and G5 of the second latch LT2 into first green, third green and fifth green data voltages Vg1, Vg3 and Vg5 and may transmit the first green, third green and fifth green data voltages Vg1, Vg3 and Vg5 to the first buffer BF1. The first blue digital analog converter DACb1 may convert the first blue, third blue and fifth blue image data B1, B3 and B5 of the third latch LT3 into first blue, third blue and fifth blue data voltages Vb1, Vb3 and Vb5 and may transmit the first blue, third blue and fifth blue data voltages Vb1, Vb3 and Vb5 to the second buffer BF2. The second red digital analog converter DACr2 may convert the second red, fourth red and sixth red image data R2, R4 and R6 of the fourth latch LT4 into second red, fourth red and sixth red data voltages Vr2, Vr4 and Vr6 and may transmit the second red, fourth red and sixth red data voltages Vr2, Vr4 and Vr6 to the second buffer BF2. The second green digital analog converter DACg2 may convert the second green, fourth green and sixth green image data G2, G4 and G6 of the fifth latch LT5 into second green, fourth green and sixth green data voltages Vg2, Vg4 and Vg6 and may transmit the second green, fourth green and sixth green data voltages Vg2, Vg4 and Vg6 to the third buffer BF3. The second blue digital analog converter DACb2 may convert the second blue, fourth blue and sixth blue image data B2, B4 and B6 of the sixth latch LT6 into second blue, fourth blue and sixth blue data voltages Vb2, Vb4 and Vb6 and may transmit the second blue, fourth blue and sixth blue data voltages Vb2, Vb4 and Vb6 to the third buffer BF3.

The plurality of buffers BF1, BF2 and BF3 stabilize the plurality of data voltages received from the plurality of red digital analog converters DACr1 and DACr2, the plurality of green digital analog converters DACg1 and DACg2 and the plurality of blue digital analog converters DACb1 and DACb2 and sequentially output the plurality of data voltages through an output terminal (a channel).

For example, the first buffer BF1 may sequentially output the first red, first green, third red, third green, fifth red and fifth green data voltages Vr1, Vg1, Vr3, Vg3, Vr5 and Vg5 of the first red digital analog converter DACr1 and the first green digital analog converter DACg1 through a first output terminal. The second buffer BF2 may sequentially output the first blue, second red, third blue, fourth red, fifth blue and sixth red data voltages Vb1, Vr2, Vb3, Vr4, Vb5 and Vr6 of the first blue digital analog converter DACb1 and the second red digital analog converter DACr2 through a second output terminal. The third buffer BF3 may sequentially output the second green, second blue, fourth green, fourth blue, sixth green and sixth blue data voltages Vg2, Vb2, Vg4, Vb4, Vg6 and Vb6 of the second green digital analog converter DACg2 and the second blue digital analog converter DACb2 through a third output terminal.

The plurality of first MUX switches MT1 and the plurality of second MUX switches MT2 sequentially transmit the plurality of data voltages outputted from the plurality of buffers BF1, BF2 and BF3 to the plurality of data lines DL according to first and second MUX signals MUX1 and MUX2.

For example, according to the first MUX signal MUX1, the plurality of first MUX switches MT1 may sequentially transmit the first red, third red and fifth red data voltages Vr1, Vr3 and Vr5 of the first buffer BF1 to a first data line, may sequentially transmit the first blue, third blue and fifth blue data voltages Vb1, Vb3 and Vb5 of the second buffer BF2 to a third data line, and may sequentially transmit the second green, fourth green and sixth green data voltages Vg2, Vg4 and Vg6 of the third buffer BF3 to a fifth data line.

According to the second MUX signal MUX2, the plurality of second MUX switches MT2 may sequentially transmit the first green, third green and fifth green data voltages Vg1, Vg3 and Vg5 of the first buffer BF1 to a second data line, may sequentially transmit the second red, fourth red and sixth red data voltages Vr2, Vr4 and Vr6 of the second buffer BF2 to a fourth data line, and may sequentially transmit the second blue, fourth blue and sixth blue data voltages Vb2, Vb4 and Vb6 of the third buffer BF3 to a sixth data line.

The plurality of red subpixels SPr, the plurality of green subpixels SPg and the plurality of blue subpixels SPb display an image using the plurality of data voltages transmitted through the plurality of first MUX switches MT1, the plurality of second MUX switches MT2 and the plurality of data lines DL.

Each of the red, green and blue subpixels SPr, SPg and SPb is connected to the data line DL and the gate line GL such that the source electrode and the gate electrode of the first transistor T1 (of FIG. 2) in each of the red, green and blue subpixels SPr, SPg and SPb are connected to the data line DL and the gate line GL, respectively.

For example, the first red, first green, first blue, second red, second green and second blue subpixels SPr1, SPg1, SPb1, SPr2, SPg2 and SPb2 in a first horizontal pixel line may emit lights of luminances corresponding to the first red, first green, first blue, second red, second green and second blue data voltages Vr1, Vg1, Vb1, Vr2, Vg2 and Vb2, respectively. The third red, third green, third blue, fourth red, fourth green and fourth blue subpixels SPr3, SPg3, SPb3, SPr4, SPg4 and SPb4 in a second horizontal pixel line may emit lights of luminances corresponding to the third red, third green, third blue, fourth red, fourth green and fourth blue data voltages Vr3, Vg3, Vb3, Vr4, Vg4 and Vb4, respectively. The fifth red, fifth green, fifth blue, sixth red, sixth green and sixth blue subpixels SPr5, SPg5, SPb5, SPr6, SPg6 and SPb6 in a third horizontal pixel line may emit lights of luminances corresponding to the fifth red, fifth green, fifth blue, sixth red, sixth green and sixth blue data voltages Vr5, Vg5, Vb5, Vr6, Vg6 and Vb6, respectively.

In FIG. 4, during a first time period TP1, the (n−1)th gate voltage Scan(n−1) has a low level voltage and the eighth and tenth transistors T8 and T10 are turned on such that the first and second electrodes of the storage capacitor Cst have the initialization voltage Vini and the reference voltage Vref, respectively. As a result, the storage capacitor Cst is initialized.

During a second time period TP2 after the first time period TP1, the nth gate voltage Scan(n) has a low level voltage and the first, fifth, sixth and ninth transistors T1, T5, T6 and T9 are turned on such that the first electrode of the storage capacitor Cst has a sum (Vdata+Vth) of the data voltage Vdata and a threshold voltage Vth and the second electrodes of the storage capacitor Cst has the reference voltage Vref. As a result, the storage capacitor Cst stores a compensated data voltage.

During a third time period TP3 between the first and second time periods TP1 and TP2, the first MUX signal MUX1 has a low level voltage and the plurality of first MUX transistors MT1 are turned on. During a fifth time period TP5 wider than and overlapping the third time period TP3, the first red, third red and fifth red image data R1, R3 and R5 (RGB1(R)) of the first latch LT1 are inputted. As a result, during the fifth time period TP5, the first red, third red and fifth red data voltages Vr1, Vr3 and Vr5 are sequentially transmitted to the first red, third red and fifth red subpixels SPr1, SPr3 and SPr5 of the first, second and third horizontal pixel lines, respectively.

During a fourth time period TP4 connected to the third time period TP3 and overlapping the second time period TP2, the second MUX signal MUX2 has a low level voltage and the plurality of second MUX transistors MT2 are turned on. During a sixth time period TP6 wider than and overlapping the fourth time period TP4, the first green, third green and fifth green image data G1, G3 and G5 (RGB2(G)) of the second latch LT2 are inputted. As a result, during the sixth time period TP6, the first green, third green and fifth green data voltages Vg1, Vg3 and Vg5 are sequentially transmitted to the first green, third green and fifth green subpixels SPg1, SPg3 and SPg5 of the first, second and third horizontal pixel lines, respectively.

Accordingly, in the first horizontal pixel line, during the fifth time period TP5, the first red, the first blue and the second green data voltages Vr1, Vb1 and Vg2 are simultaneously transmitted to the first red, first blue and second green subpixels SPr1, SPb1 and SPg2, respectively. In the first horizontal pixel line, during the sixth time period TP6 after the fifth time period TP5, the first green, the second red and the second blue data voltages Vg1, Vr2 and Vb2 are simultaneously transmitted to the first green, second red and second blue subpixels SPg1, SPr2 and SPb2, respectively.

In the second horizontal pixel line, during the fifth time period TP5, the third red, third blue and fourth green data voltages Vr3, Vb3 and Vg4 are simultaneously transmitted to the third red, third blue and fourth green subpixels SPr3, SPb3 and SPg4, respectively. In the second horizontal pixel line, during the sixth time period TP6 after the fifth time period TP5, the third green, fourth red and fourth blue data voltages Vg3, Vr4 and Vb4 are simultaneously transmitted to the third green, fourth red and fourth blue subpixels SPg3, SPr4 and SPb4, respectively.

In the third horizontal pixel line, during the fifth time period TP5, the fifth red, the fifth blue and the sixth green data voltages Vr5, Vb5 and Vg6 are simultaneously transmitted to the fifth red, fifth blue and sixth green subpixels SPr5, SPb5 and SPg6, respectively. In the third horizontal pixel line, during the sixth time period TP6 after the fifth time period TP5, the fifth green, sixth red and sixth blue data voltages Vg5, Vr6 and Vb6 are simultaneously transmitted to the fifth green, sixth red and sixth blue subpixels SPg5, SPr6 and SPb6, respectively.

In FIG. 5, for each of the plurality of horizontal pixel lines, the data voltage is firstly transmitted to a left subpixel among adjacent two of the red, green and blue subpixels SPr, SPg and SPb, and the data voltage is secondly transmitted to a right subpixel among adjacent two of the red, green and blue subpixels SPr, SPg and SPb.

In the display device 110 according to a first aspect of the present disclosure, the plurality of data voltages sequentially outputted from one output terminal (one channel) of the data driving part 130 are sequentially transmitted to the two adjacent subpixels in one horizontal pixel line through the plurality of first MUX switches MT1 and the plurality of second MUX switches MT2 of the display panel 150.

Accordingly, since a number of the output terminals (a number of pins) of the data driving part 130 is reduced, a number of the required data driving parts (integrated circuits) 130 is reduced and a fabrication cost is reduced.

In the display device 110 according to a first aspect of the present disclosure, the data voltage are applied to the subpixels of the two adjacent pixels of the plurality of horizontal pixel lines with a zigzag shape as shown in FIGS. 3 and 5.

In all of the plurality of horizontal pixel lines, the data voltage is firstly applied to the left subpixel of the two adjacent subpixels and is secondly applied to the right subpixel of the two adjacent subpixels. Since a charging time of the data voltage firstly applied to the left subpixel is longer than a charging time of the data voltage secondly applied to the right subpixel, the data voltage firstly applied to the left subpixel may emit a light of a luminance higher than a luminance of a light emitted by the data voltage secondly applied to the right subpixel.

Since difference of supply sequence of the data voltage causes difference of charging degree of the data voltage and luminance deviation, deterioration such as a vertical line stain may occur.

When an optical compensation using a luminance detecting device such as a camera is performed for the display device 110 according to a first aspect of the present disclosure, it is required to consider a luminance non-uniformity due to the luminance deviation as shown in FIG. 5. As a result, there is a limitation such that a luminance detecting device has a first resolution corresponding to the subpixel.

Figure 6:
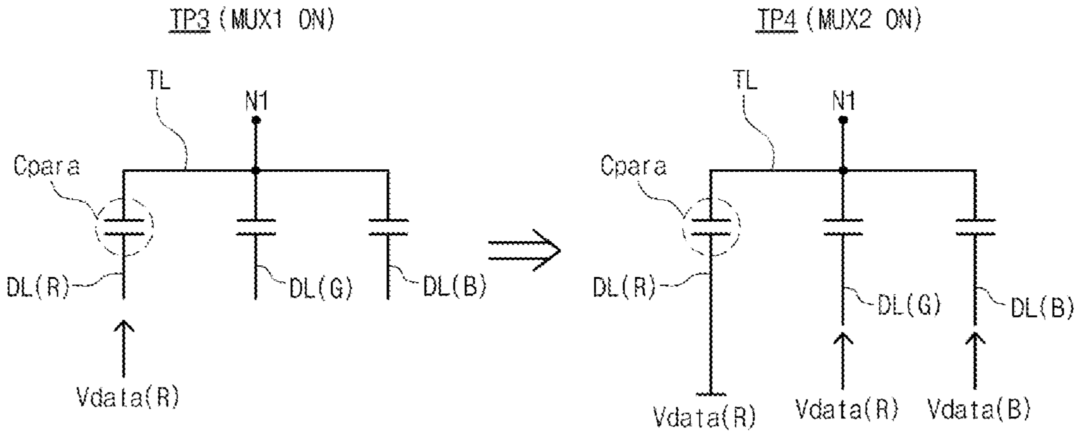
FIG. 6 is a view showing a parasitic capacitance between a transmission line and a data line of a display device according to a first aspect of the present disclosure.

FIG. 6 is a view showing a parasitic capacitance between a transmission line and a data line of a display device according to a first aspect of the present disclosure.

In FIG. 6, for simplifying driving elements of each subpixel, first nodes N1 of adjacent red, green and blue subpixels SPr, SPg and SPb are connected to each other through a transmission line TL, and the reference voltage Vref is supplied to a pair of the ninth and tenth transistors T9 and T10 of the red, green and blue subpixels SPr, SPg and SPb. As a result, the transmission line TL and the data line DL of each subpixel overlap each other to constitute a parasitic capacitance Cpara.

During a period where the light emitting diode Del does not emit a light due to a duty ratio, the seventh transistor T7 is turned off according to the emission voltage Em(n) corresponding to an off state, and the high level voltage VDD is not applied to the first node N1 such that the first node N1 has a floating state.

Accordingly, after the first red, first blue and second green data voltages Vr1, Vb1 and Vg2 are transmitted through the data line DL during the third time period TP3, during the fourth time period TP4 where the first green, second red and second blue data voltages Vg1, Vr2 and Vb2 are transmitted through the data line DL, the first red, first blue and second green data voltages Vr1, Vb1 and Vg2 charged in the subpixel are changed due to a coupling of the first green, second red and second blue data voltages Vg1, Vr2 and Vb2 through the parasitic capacitance Cpara to cause difference in color sense.

In a display device according to a second aspect of the present disclosure, the above drawbacks may be improved by sequentially transmitting a data voltage to subpixels of the same color through first and second MUX switches.

Figure 7:
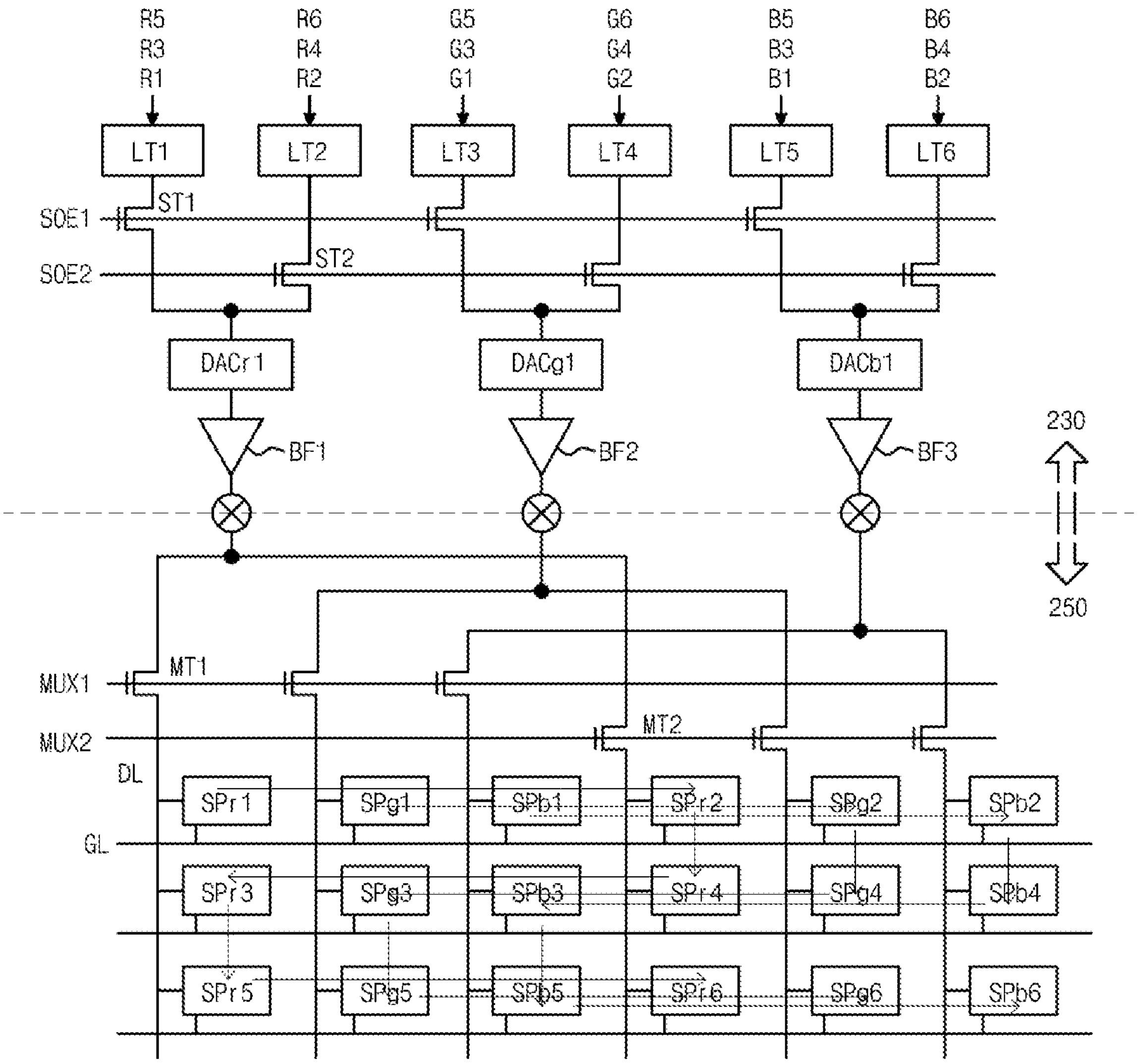
FIG. 7 is a view showing a data driving part and a display panel of a display device according to a second aspect of the present disclosure.
Figure 8:
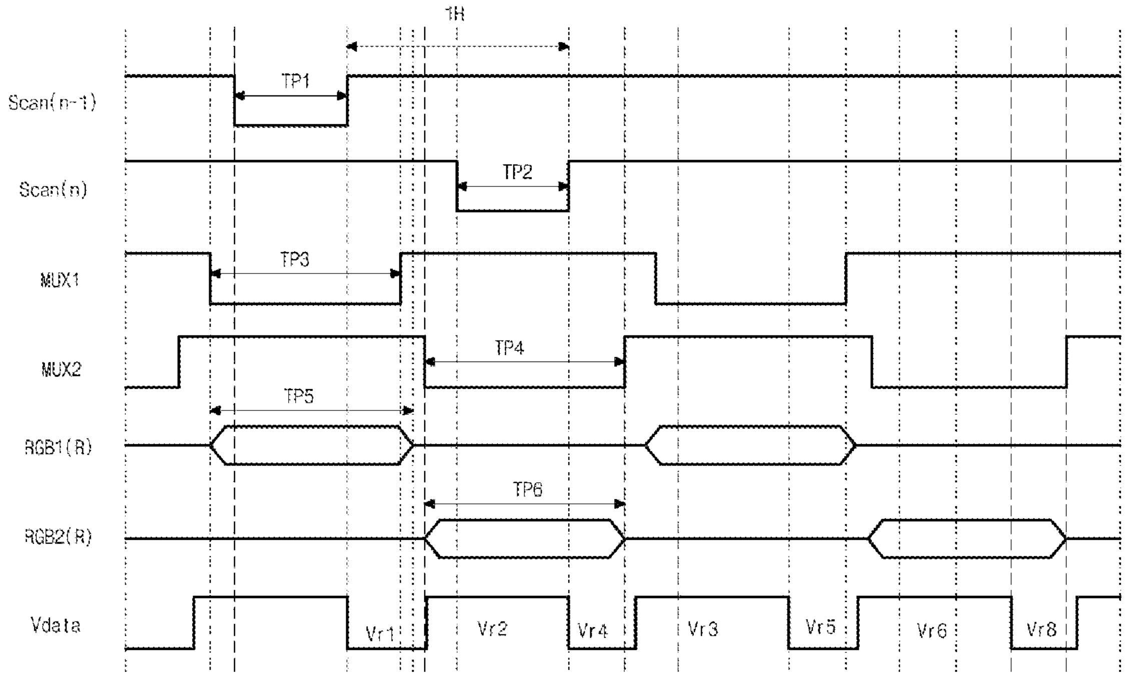
FIG. 8 is a view showing a plurality of signals of a data driving part and a display panel of a display device according to a second aspect of the present disclosure.
Figure 9:
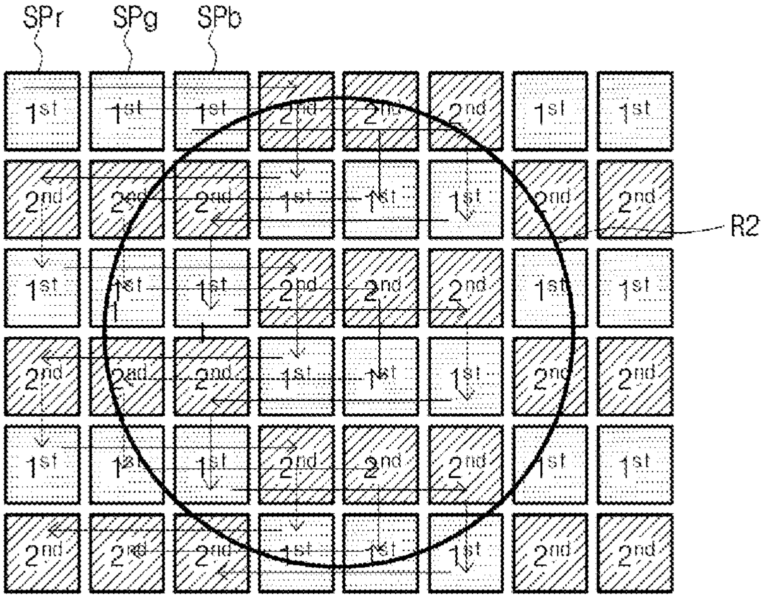
FIG. 9 is a view showing a supply sequence of a data voltage to a plurality of subpixels of a display device according to a second aspect of the present disclosure.

FIG. 7 is a view showing a data driving part and a display panel of a display device according to a second aspect of the present disclosure, FIG. 8 is a view showing a plurality of signals of a data driving part and a display panel of a display device according to a second aspect of the present disclosure, and FIG. 9 is a view showing a supply sequence of a data voltage to a plurality of subpixels of a display device according to a second aspect of the present disclosure. Illustration on parts the same as parts of the first aspect will be omitted.

In FIG. 7, a data driving part 230 of a display device 210 (see FIG. 12B) according to a second aspect of the present disclosure may include a plurality of latches LT1 to LT6, a plurality of first source switches ST1, a plurality of second source switches ST2, a red digital analog converter DACr1, a green digital analog converter DACg1, a blue digital analog converter DACb1 and a plurality of buffers BF1, BF2 and BF3 connected between the plurality of digital analog converters DACr1, DACg1 and DACb1 and a plurality of output terminal, respectively. The display panel 250 of the display device 210 according to a second aspect of the present disclosure may include a plurality of first MUX switches MT1, a plurality of second MUX switches MT2, a plurality of red subpixels SPr, a plurality of green subpixels SPg and a plurality of blue subpixels SPb.

The data driving part 230 may be connected to a non-display area surrounding a display area of the display panel 250. The plurality of first MUX switches MT1 and the plurality of second MUX switches MT2 may be disposed in the non-display area of the display panel 250.

The plurality of latches LT1 to LT6 sequentially receive image data of each color from a timing controlling part and store the image data of each color for a time corresponding to one clock. Next, the plurality of latches LT1 to LT6 sequentially output the image data of each color to the red digital analog converter DACr1, the green digital analog converter DACg1 and the blue digital analog converter DACb1 through the plurality of first source switches ST1 and the plurality of second source switches ST2.

For example, first red, third red and fifth red image data R1, R3 and R5 may be sequentially inputted to and sequentially outputted from the first latch LT1, second red, fourth red and sixth red image data R2, R4 and R6 may be sequentially inputted to and sequentially outputted from the second latch LT2, and first green, third green and fifth green image data G1, G3 and G5 may be sequentially inputted to and sequentially outputted from the third latch LT3. Second green, fourth green and sixth green image data G2, G4 and G6 may be sequentially inputted to and sequentially outputted from the fourth latch LT4, first blue, third blue and fifth blue image data B1, B3 and B5 may be sequentially inputted to and sequentially outputted from the fifth latch LT5, and second blue, fourth blue and sixth blue image data B2, B4 and B6 may be sequentially inputted to and sequentially outputted from the sixth latch LT6.

The plurality of first source switches ST1 and the plurality of second source switches ST2 sequentially transmit the image data of each color outputted from the adjacent latches LT1 to LT6 to the red digital analog converter DACr1, the green digital analog converter DACg1 and the blue digital analog converter DACb1 at different timings according to first and second source enable signals SOE1 and SOE2, respectively.

For example, according to the first source enable signal SOE1, the plurality of first source switches ST1 may sequentially transmit the first red, third red and fifth red image data R1, R3 and R5 of the first latch LT1 to the first red digital analog converter DACr1, may sequentially transmit the first green, third green and fifth green image data G1, G3 and G5 of the third latch LT3 to the first green digital analog converter DACg1, and may sequentially transmit the first blue, third blue and fifth blue image data B1, B3 and B5 of the fifth latch LT5 to the first blue digital analog converter DACb1.

According to the second source enable signal SOE2, the plurality of second source switches ST2 may sequentially transmit the second red, fourth red and sixth red image data R2, R4 and R6 of the second latch LT2 to the first red digital analog converter DACr1, may sequentially transmit the second green, fourth green and sixth green image data G2, G4 and G6 of the fourth latch LT4 to the first green digital analog converter DACg1, and may sequentially transmit the second blue, fourth blue and sixth blue image data B2, B4 and B6 of the sixth latch LT6 to the first blue digital analog converter DACb1.

The red digital analog converter DACr1, the green digital analog converter DACg1 and the blue digital analog converter DACb1 convert the image data inputted from the plurality of latches LT1 to LT6 into a data voltage and sequentially output the data voltage.

For example, the first red digital analog converter DACr1 may convert the first red, second red, fourth red, third red, fifth red and sixth red image data R1, R2, R4, R3, R5 and R6 of the first and second latches LT1 and LT2 into first red, second red, fourth red, third red, fifth red and sixth red data voltages Vr1, Vr2, Vr4, Vr3, Vr5 and Vr6 and may transmit the first red, second red, fourth red, third red, fifth red and sixth red data voltages Vr1, Vr2, Vr4, Vr3, Vr5 and Vr6 to the first buffer BF1. The first green digital analog converter DACg1 may convert the first green, second green, fourth green, third green, fifth green and sixth green image data G1, G2, G4, G3, G5 and G6 of the third and fourth latches LT3 and LT4 into first green, second green, fourth green, third green, fifth green and sixth green data voltages Vg1, Vg2, Vg4, Vg3, Vg5 and Vg6 and may transmit the first green, second green, fourth green, third green, fifth green and sixth green data voltages Vg1, Vg2, Vg4, Vg3, Vg5 and Vg6 to the second buffer BF2. The first blue digital analog converter DACb1 may convert the first blue, second blue, fourth blue, third blue, fifth blue and sixth blue image data B1, B2, B4, B3, B5 and B6 of the fifth and sixth latches LT5 and LT6 into first blue, second blue, fourth blue, third blue, fifth blue and sixth blue data voltages Vb1, Vb2, Vb4, Vb3, Vb5 and Vb6 and may transmit the first blue, second blue, fourth blue, third blue, fifth blue and sixth blue data voltages Vb1, Vb2, Vb4, Vb3, Vb5 and Vb6 to the third buffer BF3.

The plurality of buffers BF1, BF2 and BF3 stabilize the plurality of data voltages received from the red digital analog converter DACr1, the green digital analog converter DACg1 and the blue digital analog converter DACb1 and sequentially output the plurality of data voltages through an output terminal (a channel).

For example, the first buffer BF1 may sequentially output the first red, second red, fourth red, third red, fifth red and sixth red data voltages Vr1, Vr2, Vr4, Vr3, Vr5 and Vr6 of the first red digital analog converter DACr1 through a first output terminal. The second buffer BF2 may sequentially output the first green, second green, fourth green, third green, fifth green and sixth green data voltages Vg1, Vg2, Vg4, Vg3, Vg5 and Vg6 of the first green digital analog converter DACg1 through a second output terminal. The third buffer BF3 may sequentially output the first blue, second blue, fourth blue, third blue, fifth blue and sixth blue data voltages Vb1, Vb2, Vb4, Vb3, Vb5 and Vb6 of the first blue digital analog converter DACb1 through a third output terminal.

The plurality of first MUX switches MT1 and the plurality of second MUX switches MT2 sequentially transmit the plurality of data voltages outputted from the plurality of buffers BF1, BF2 and BF3 to the plurality of data lines DL according to first and second MUX signals MUX1 and MUX2. As an embodiment, the plurality of first MUX switches MT1 and the plurality of second MUX switches MT2 may sequentially transmit the first red, second red, third red, fourth red, fifth red and sixth red image data R1 to R6 to the first red digital analog converter DACr1, sequentially transmit the first green, second green, third green, fourth green, fifth green and sixth green image data G1 to G6 to the first green digital analog converter DACg1, and sequentially transmit the first blue, second blue, third blue, fourth blue, fifth blue and sixth blue image data B1 to B6 to the first blue digital analog converter DACb1.

For example, according to the first MUX signal MUX1, the plurality of first MUX switches MT1 may sequentially transmit the first red, third red and fifth red data voltages Vr1, Vr3 and Vr5 of the first buffer BF1 to a first data line, may sequentially transmit the first green, third green and fifth green data voltages Vg1, Vg3 and Vg5 of the second buffer BF2 to a second data line, and may sequentially transmit the first blue, third blue and fifth blue data voltages Vb1, Vb3 and Vb5 of the third buffer BF3 to a third data line.

According to the second MUX signal MUX2, the plurality of second MUX switches MT2 may sequentially transmit the second red, fourth red and sixth red data voltages Vr2, Vr4 and Vr6 of the first buffer BF1 to a fourth data line, may sequentially transmit the second green, fourth green and sixth green data voltages Vg2, Vg4 and Vg6 of the second buffer BF2 to a fifth data line, and may sequentially transmit the second blue, fourth blue and sixth blue data voltages Vb2, Vb4 and Vb6 of the third buffer BF3 to a sixth data line.

The plurality of red subpixels SPr, the plurality of green subpixels SPg and the plurality of blue subpixels SPb display an image using the plurality of data voltages transmitted through the plurality of first MUX switches MT1, the plurality of second MUX switches MT2 and the plurality of data lines DL.

For example, the first red, first green, first blue, second red, second green and second blue subpixels SPr1, SPg1, SPb1, SPr2, SPg2 and SPb2 in a first horizontal pixel line may emit lights of luminances corresponding to the first red, first green, first blue, second red, second green and second blue data voltages Vr1, Vg1, Vb1, Vr2, Vg2 and Vb2, respectively. The third red, third green, third blue, fourth red, fourth green and fourth blue subpixels SPr3, SPg3, SPb3, SPr4, SPg4 and SPb4 in a second horizontal pixel line may emit lights of luminances corresponding to the third red, third green, third blue, fourth red, fourth green and fourth blue data voltages Vr3, Vg3, Vb3, Vr4, Vg4 and Vb4, respectively. The fifth red, fifth green, fifth blue, sixth red, sixth green and sixth blue subpixels SPr5, SPg5, SPb5, SPr6, SPg6 and SPb6 in a third horizontal pixel line may emit lights of luminances corresponding to the fifth red, fifth green, fifth blue, sixth red, sixth green and sixth blue data voltages Vr5, Vg5, Vb5, Vr6, Vg6 and Vb6, respectively.

In FIG. 8, during a first time period TP1, an (n−1)th gate voltage Scan(n−1) has a low level voltage and the eighth and tenth transistors T8 and T10 are turned on such that first and second electrodes of a storage capacitor Cst have an initialization voltage Vini and a reference voltage Vref, respectively. As a result, the storage capacitor Cst is initialized.

During a second time period TP2 after the first time period TP1, an nth gate voltage Scan(n) has a low level voltage and the first, fifth, sixth and ninth transistors T1, T5, T6 and T9 are turned on such that the first electrode of the storage capacitor Cst has a sum (Vdata+Vth) of the data voltage Vdata and a threshold voltage Vth and the second electrodes of the storage capacitor Cst has the reference voltage Vref. As a result, the storage capacitor Cst stores a compensated data voltage.

During a third time period TP3 wider than and overlapping the first time period TP1, the first MUX signal MUX1 has a low level voltage and the plurality of first MUX transistors MT1 are turned on. During a fifth time period TP5 overlapping the third time period TP3, the first red, third red and fifth red image data R1, R3 and R5 (RGB1(R)) of the first latch LT1 are inputted. As a result, during the fifth time period TP5, the first red, third red and fifth red data voltages Vr1, Vr3 and Vr5 are sequentially transmitted to the first red, third red and fifth red subpixels SPr1, SPr3 and SPr5 of the first, second and third horizontal pixel lines, respectively.

During a fourth time period TP4 connected to the third time period TP3 and overlapping the second time period TP2, the second MUX signal MUX2 has a low level voltage and the plurality of second MUX transistors MT2 are turned on. During a sixth time period TP6 overlapping the fourth time period TP4, the second red, fourth red and sixth red image data R2, R4 and R6 (RGB2(R)) of the second latch LT2 are inputted. As a result, the second red, fourth red and sixth red data voltages Vr2, Vr4 and Vr6 are sequentially transmitted to the second red, fourth red and sixth red subpixels SPr2, SPr4 and SPr6 of the first, second and third horizontal pixel lines, respectively.

Accordingly, in the first horizontal pixel line, during the fifth time period TP5, the first red, the first green and the first blue data voltages Vr1, Vg1 and Vb1 are simultaneously transmitted to the first red, first green and first blue subpixels SPr1, SPg1 and SPb1, respectively. In the first horizontal pixel line, during the sixth time period TP6 after the fifth time period TP5, the second red, the second green and the second blue data voltages Vr2, Vg2 and Vb2 are simultaneously transmitted to the second red, second green and second blue subpixels SPr2, SPg2 and SPb2, respectively.

In the second horizontal pixel line, during the fifth time period TP5, the fourth red, fourth green and fourth blue data voltages Vr4, Vg4 and Vb4 are simultaneously transmitted to the fourth red, fourth green and fourth blue subpixels SPr4, SPg4 and SPb4, respectively. In the second horizontal pixel line, during the sixth time period TP6 after the fifth time period TP5, the third red, third green and third blue data voltages Vr3, Vg3 and Vb3 are simultaneously transmitted to the third red, third green and third blue subpixels SPr3, SPg3 and SPb3, respectively.

In the third horizontal pixel line, during the fifth time period TP5, the fifth red, the fifth green and the fifth blue data voltages Vr5, Vg5 and Vb5 are simultaneously transmitted to the fifth red, fifth green and fifth blue subpixels SPr5, SPg5 and SPb5, respectively. In the third horizontal pixel line, during the sixth time period TP6 after the fifth time period TP5, the sixth red, sixth green and sixth blue data voltages Vr6, Vg6 and Vb6 are simultaneously transmitted to the sixth red, sixth green and sixth blue subpixels SPr6, SPg6 and SPb6, respectively.

In the display device 210 according to a second aspect of the present disclosure, the data voltages are applied to the subpixels of the two adjacent pixels of the plurality of horizontal pixel lines with a square wave shape as shown in FIGS. 7 and 9.

For an odd horizontal pixel line including first, third and fifth horizontal pixel lines, the data voltage is firstly transmitted to the red, green and blue subpixels SPr, SPg and SPb of a left pixel among two adjacent pixels, and the data voltage is secondly transmitted to the red, green and blue subpixels SPr, SPg and SPb of a right pixel among two adjacent pixels. For an even horizontal pixel line including second, fourth and sixth horizontal pixel lines, the data voltage is firstly transmitted to the red, green and blue subpixels SPr, SPg and SPb of a right pixel among two adjacent pixels, and the data voltage is secondly transmitted to the red, green and blue subpixels SPr, SPg and SPb of a left pixel among two adjacent pixels.

Since a charging time of the firstly applied data voltage is longer than a charging time of the secondly applied data voltage, the firstly applied data voltage may emit a light of a luminance higher than a luminance of a light emitted by the secondly applied data voltage. However, since application sequences of the data voltage with respect to the odd horizontal pixel line and the even horizontal pixel line are opposite to each other, high luminance and low luminance are uniformly mixed in a whole of the display panel 250 and luminance deviation is minimized.

In the display device 210 according to a second aspect of the present disclosure, the plurality of data voltages sequentially outputted from one output terminal (one channel) of the data driving part 230 are sequentially transmitted to the two subpixels of the same color of the two adjacent pixels in the same horizontal pixel line through the plurality of first MUX switches MT1 and the plurality of second MUX switches MT2 of the display panel 250.

Accordingly, since a number of the output terminals (a number of pins) of the data driving part 230 is reduced and a number of the digital analog converters is reduced, a number of the required data driving parts (integrated circuits) 230 is reduced and a fabrication cost is reduced.

In FIG. 9, since the application sequence of the data voltage to the two subpixels of the same color of the two adjacent pixels of the odd horizontal pixel line and the application sequence of the data voltage to the two subpixels of the same color of the two adjacent pixels of the even horizontal pixel line are opposite to each other, the application sequences of the data voltage to the whole of the display panel 250 become uniform. As a result, the luminance deviation is reduced and deterioration such as a vertical line stain is prevented.

In addition, when an optical compensation using a luminance detecting device such as a camera is performed for the display device 210 according to a second aspect of the present disclosure, it is not required to consider a luminance non-uniformity due to the luminance deviation as shown in FIG. 9. As a result, a luminance detecting device having a second resolution lower than a first resolution corresponding to the subpixel may be used for the optical compensation, and a limitation for a luminance detecting device is removed.

Figure 10:
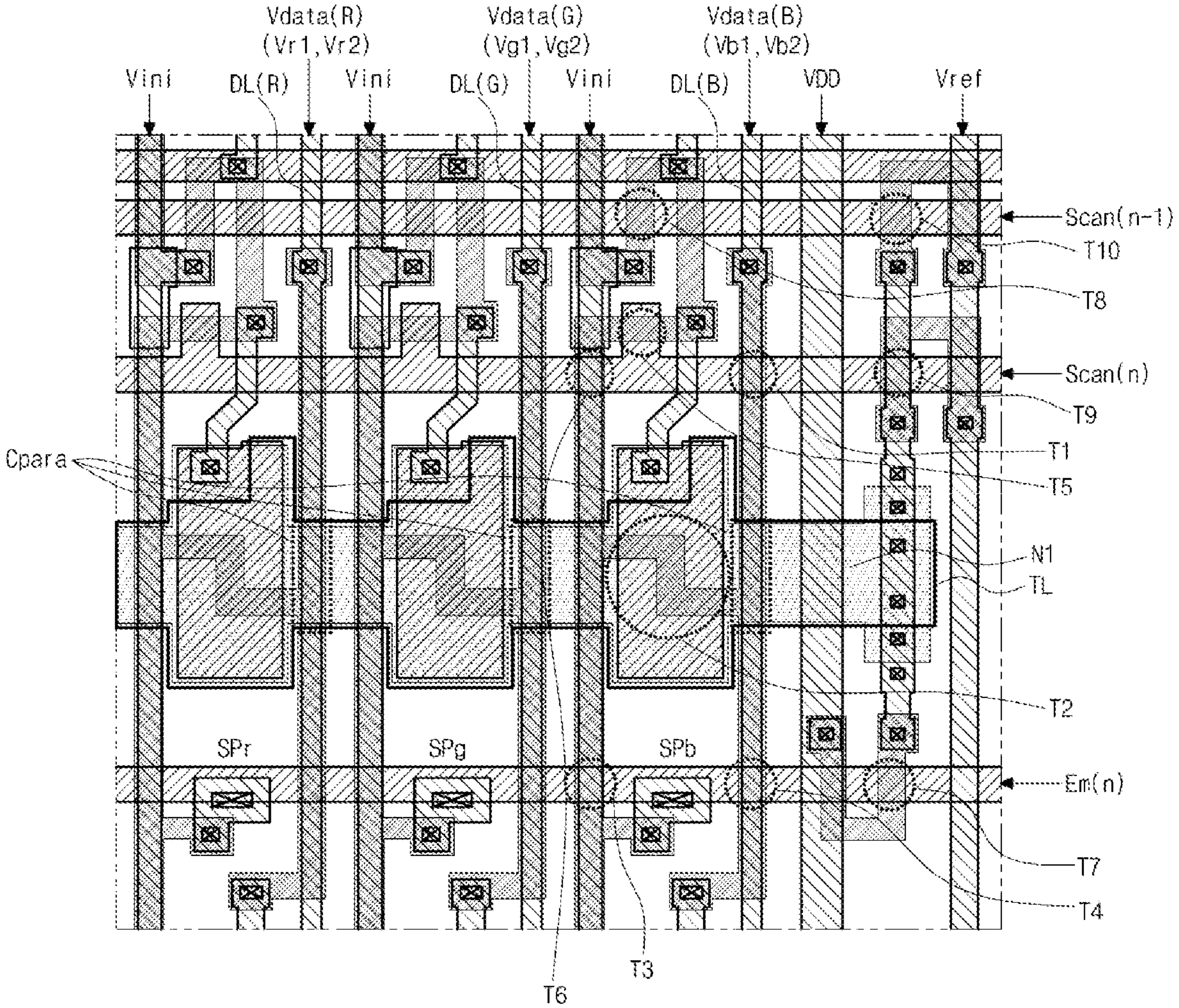
FIG. 10 is a plan view showing red, green and blue subpixels of a display device according to a second aspect of the present disclosure.
Figure 11:
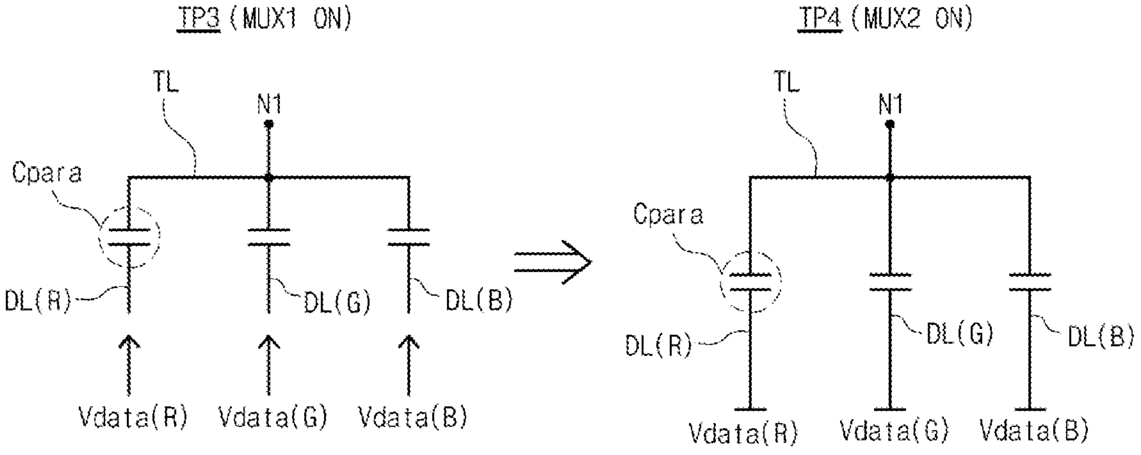
FIG. 11 is a view showing a parasitic capacitance between a transmission line and a data line of a display device according to a second aspect of the present disclosure.

FIG. 10 is a plan view showing red, green and blue subpixels of a display device according to a second aspect of the present disclosure, and FIG. 11 is a view showing a parasitic capacitance between a transmission line and a data line of a display device according to a second aspect of the present disclosure.

In FIGS. 10 and 11, the display device 210 according to a second aspect of the present disclosure includes the red, green and blue subpixels SPr, SPg and SPb, and each of the red, green and blue subpixels SPr, SPg and SPb includes first to tenth transistors T1 to T10, a storage capacitor Cst and a light emitting diode Del.

The first transistor T1 of a switching transistor may be connected between the data voltage Vdata and the second and fourth transistors T2 and T4 and may be switched according to an (n)th gate voltage Scan(n).

The second transistor T2 of a driving transistor may be connected between the first and fourth transistors T1 and T4 and the third and fifth transistors T3 and T5 and may be switched according to a voltage of a first electrode of the storage capacitor Cst.

The third transistor T3 may be connected between the second and fifth transistors T2 and T5 and the sixth transistor T6 and the light emitting diode Del and may be switched according to an (n)th emission voltage Em(n).

The fourth transistor T4 may be connected between the first and second transistors T1 and T2 and the seventh transistor T7 and the high level voltage VDD and may be switched according to an (n)th emission voltage Em(n).

The fifth transistor T5 may be connected between the second and third transistors T2 and T3 and the eighth transistor T8 and may be switched according to an (n)th gate voltage Scan(n).

The sixth transistor T6 may be connected between the third transistor T3 and the eighth transistor T8 and may be switched according to an (n)th gate voltage Scan(n).

The seventh transistor T7 may be connected between the fourth transistor T4 and the high level voltage VDD and the storage capacitor Cst and the ninth and tenth transistors T9 and T10 and may be switched according to an (n)th emission voltage Em(n).

The eighth transistor T8 may be connected between the storage capacitor Cst and the sixth transistor T6 and the initialization voltage Vini and may be switched according to an (n−1)th gate voltage Scan(n−1).

The ninth transistor T9 may be connected between the storage capacitor Cst, the seventh and tenth transistors T7 and T10 and the reference voltage Vref and may be switched according to an (n)th gate voltage Scan(n).

The tenth transistor T10 may be connected between the storage capacitor Cst, the seventh and ninth transistors T7 and T9 and the reference voltage Vref and may be switched according to an (n−1)th gate voltage Scan(n−1).

In the display device 210, for simplification of driving elements, first nodes N1 of the adjacent red, green and blue subpixels SPr, SPg and SPb are connected through a transmission line TL, and the reference voltage Vref is supplied to the red, green and blue subpixels SPr, SPg and SPb through a pair of the ninth and tenth transistors T9 and T10. As a result, the transmission line TL and the data line DL of each of the red, green and blue subpixels SPr, SPg and SPb overlap each other to constitute a parasitic capacitance Cpara.

Here, the first node N1 has a floating state during a period where the light emitting diode Del does not emit a light due to a duty ratio. However, after the first red, first green and first blue data voltages Vr1, Vg1 and Vb1 are simultaneously transmitted to the first red, first green and first blue subpixels SPr1, SPg1 and SPb1, respectively, through the data line DL during the third time period TP3, the second red, second green and second blue data voltages Vr2, Vg2 and Vb2 are simultaneously transmitted to the second red, second green and second blue subpixels SPr2, SPg2 and SPb2, respectively, through the data line DL during the fourth time period TP4. As a result, a situation where the data voltage charged in the subpixel is changed due to a coupling of the present data voltage through the parasitic capacitance Cpara is prevented. Since the data voltage is simultaneously transmitted to the red, green and blue subpixels SPr, SPg and SPb of one pixel, the coupling through the parasitic capacitance Cpara between the transmission line TL commonly connected to the pixel and the data line DL of the red, green and blue subpixels SPr, SPg and SPb is prevented. As a result, the variation of the charged data voltage is prevented and difference in color sense is minimized.

Further, in the display device 210 according to a second aspect of the present disclosure, since application sequences of the data voltage are opposite according to the horizontal pixel line, a period of the first and second MUX signals MUX1 and MUX2 increases. As a result, a power consumption is reduced and a sensing period is shortened.

A flexible touch display device including the display device according to first and second aspect of the present disclosure will be illustrated hereinafter.

Figure 12A:
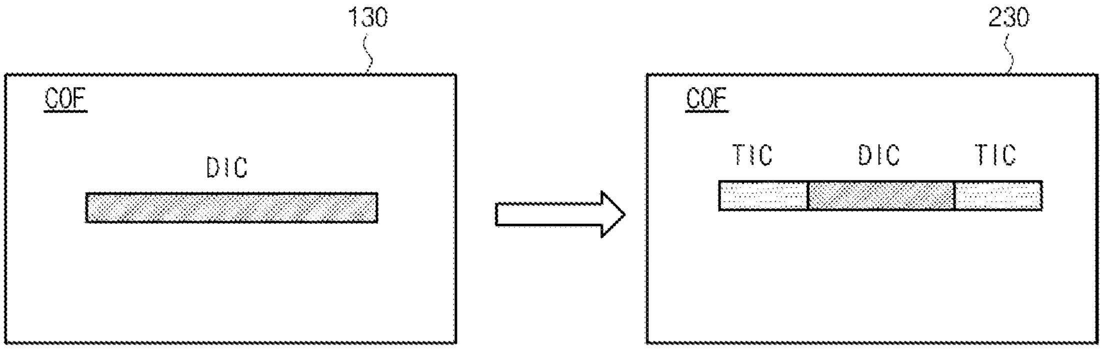
FIG. 12A is a view showing a data driving part of a display device according to first and second aspects of the present disclosure.
Figure 12B:
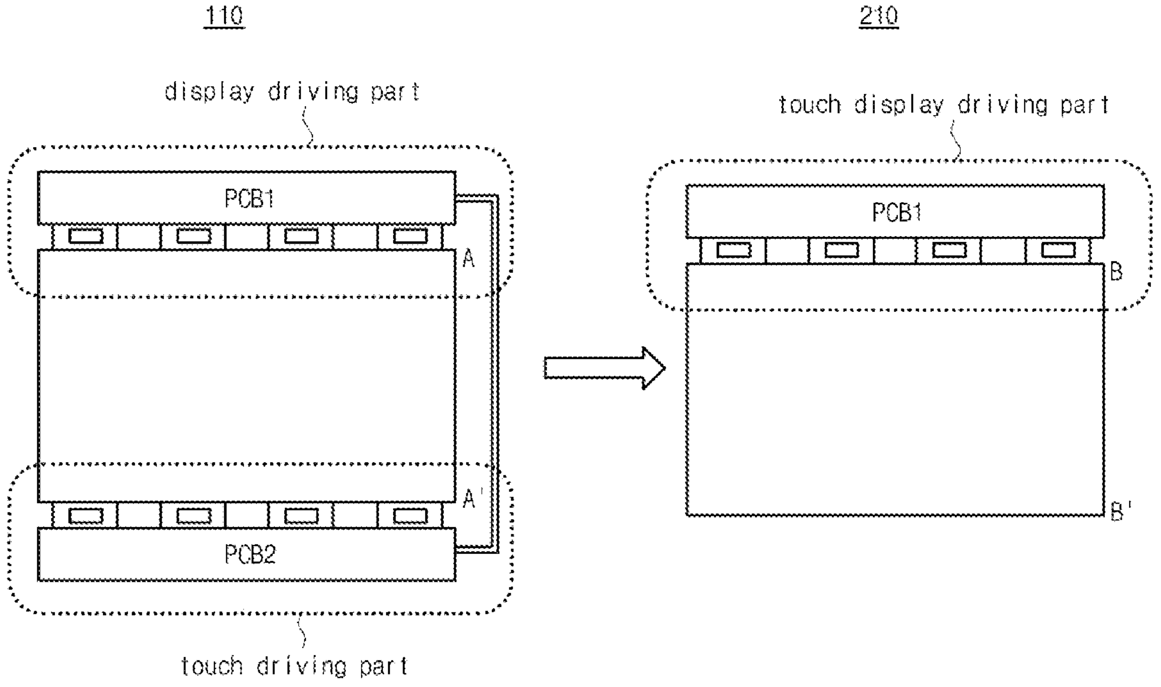
FIG. 12B is a view showing a display device according to first and second aspects of the present disclosure.
Figure 12C:
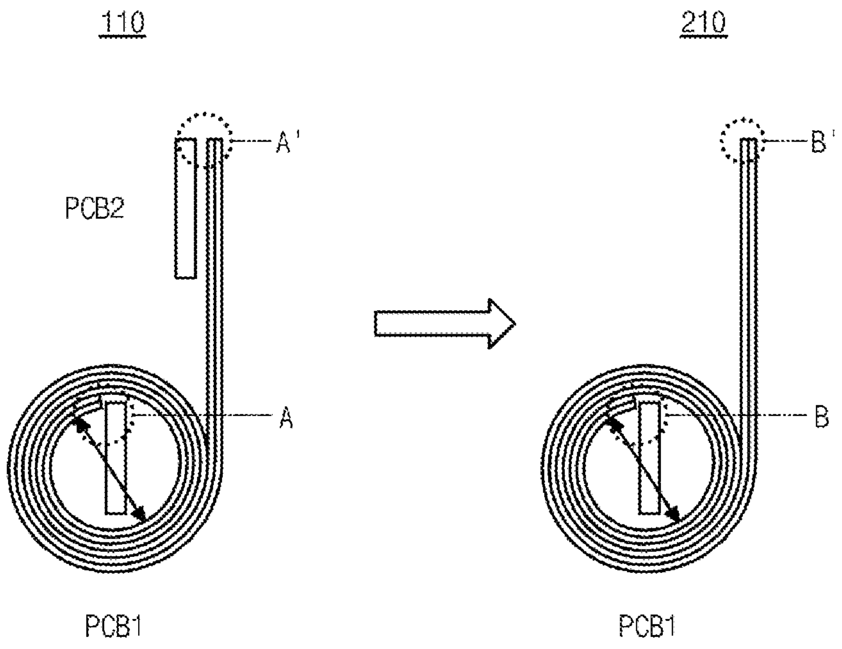
FIG. 12C is a view showing a flexible touch display device including a display device according to first and second aspects of the present disclosure.

FIG. 12A is a view showing a data driving part of a display device according to first and second aspects of the present disclosure, FIG. 12B is a view showing a display device according to first and second aspects of the present disclosure, and FIG. 12C is a view showing a flexible touch display device including a display device according to first and second aspects of the present disclosure.

In FIG. 12A, the data driving part 130 of the display device 110 according to a first aspect of the present disclosure includes a display driving circuit DIC of one integrated circuit (IC) and a chip on film COF where the integrated circuit is mounted, and the data driving part 230 of the display device 210 according to a second aspect of the present disclosure includes a display driving circuit DIC and a touch driving circuit TIC of one integrated circuit (IC) and a chip on film COF where the integrated circuit is mounted.

Since the display driving circuit DIC of the data driving part 230 according to a second aspect includes a smaller number of the digital analog converters as compared with the display driving circuit DIC of the data driving part 130 according to a first aspect, the display driving circuit DIC of the data driving part 230 according to a second aspect has a smaller size as compared with the display driving circuit DIC of the data driving part 130 according to a first aspect. As a result, a remaining space may be utilized for the touch driving circuit TIC and the display driving circuit DIC and the touch driving circuit TIC may be formed as one integrated circuit.

In the display device 110 according to a first aspect of present disclosure of FIG. 12B, the display driving part including the data driving part 130 for image display and a first printed circuit board PCB1 is connected to an upper portion of the display panel and the touch driving part including a touch driving part for touch sensing and a second printed circuit board PCB2 is connected to a lower portion of the display panel. For signal transmission, the first and second printed circuit boards PCB1 and PCB2 are electrically connected to each other.

In the display device 210 according to a second aspect of present disclosure of FIG. 12B, the touch display driving part including the data driving part 230 for image display and touch sensing and a first printed circuit board PCB1 is connected to an upper portion of the display panel and no printed circuit board is connected to a lower portion of the display panel.

In FIG. 12C, when the display device 110 according to a first aspect of the present disclosure is applied to a rollable touch display device, the first printed circuit board PCB1 is connected to a rolled end portion of the display panel and the second printed circuit board PCB2 is connected to an unrolled end portion of the display panel.

The second printed circuit board PCB2 connected to a rolled end portion of the display panel may be a hindrance to operation of the rollable touch display device and there may be a difficulty in connection of the first and second printed circuit boards PCB1 and PCB2.

When the display device 210 according to a second aspect of the present disclosure is applied to a rollable touch display device, the first printed circuit board PCB1 may be connected to the rolled end portion of the display panel and no printed circuit board may be connected to the unrolled end portion of the display panel. As a result, the rollable touch display device may freely operate and electric connection of two separated printed circuit boards may be omitted.

Consequently, in the display device according to the present disclosure, since the data voltages sequentially outputted from one output terminal of the data driving part are supplied to two subpixels of the same color of the display panel using a multiplexer, a number of the digital analog converters of the data driving part is reduced and a size and a number of the data driving part are reduced. As a result, a fabrication cost is reduced.

In addition, since the data voltages outputted from the data driving part are sequentially supplied to the subpixels of the same color of the first row and the first column, the first row and the second column, the second row and the second column and the second row and the first column of the display panel using a multiplexer, a luminance deviation is reduced and deterioration such as a vertical line stain is prevented. As a result, the luminance uniformity is improved, optical compensation is optimized, and a power consumption is reduced due to reduction of switching of input signals to the multiplexer.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device comprising:

a timing controlling part generating an image data, a data control signal and a gate control signal;

a data driving part generating a data voltage using the image data and the data control signal;

a gate driving part generating a gate voltage by using the gate control signal;

a display panel including a plurality of subpixels and displaying an image by using the data voltage and the gate voltage; and a plurality of first MUX switches and a plurality of second MUX switches sequentially transmitting the data voltage to two of a same color among the plurality of subpixels, wherein the data voltage includes first to sixth red data voltages, wherein the plurality of subpixels comprises:

first red, first green, first blue, second red, second green and second blue subpixels sequentially arranged from a left to a right in a first horizontal pixel line;

third red, third green, third blue, fourth red, fourth green and fourth blue subpixels sequentially arranged from a left to a right in a second horizontal pixel line; and fifth red, fifth green, fifth blue, sixth red, sixth green and sixth blue subpixels sequentially arranged from a left to a right in a third horizontal pixel line, and wherein the plurality of first MUX switches and the plurality of second MUX switches sequentially transmit the first red, second red, fourth red, third red, fifth red and sixth red data voltages to the first red, second red, fourth red, third red, fifth red and sixth red subpixels, respectively.

2. The display device of claim 1, wherein, according to a first MUX signal, the plurality of first MUX switches transmit the first red, third red and fifth red data voltages to the first red, third red and fifth red subpixels, respectively, transmit first green, third green and fifth green data voltages to the first green, third green and fifth green subpixels, respectively, and transmit first blue, third blue and fifth blue data voltages to the first blue, third blue and fifth blue subpixels, respectively.

3. The display device of claim 1, wherein, according to a second MUX signal, the plurality of second MUX switches transmit the second red, fourth red and sixth red data voltages to the second red, fourth red and sixth red subpixels, respectively, transmit second green, fourth green and sixth green data voltages to the second green, fourth green and sixth green subpixels, respectively, and transmit second blue, fourth blue and sixth blue data voltages to the second blue, fourth blue and sixth blue subpixels, respectively.

4. The display device of claim 3, wherein the data driving part further comprises a plurality of buffers connected between the plurality of digital analog converters and a plurality of output terminals, respectively.

5. The display device of claim 1, wherein the plurality of first MUX switches and the plurality of second MUX switches sequentially transmit the first green, second green, fourth green, third green, fifth green and sixth green data voltages to the first green, second green, fourth green, third green, fifth green and sixth green subpixels, respectively, and sequentially transmit the first blue, second blue, fourth blue, third blue, fifth blue and sixth blue data voltages to the first blue, second blue, fourth blue, third blue, fifth blue and sixth blue subpixels, respectively.

6. The display device of claim 1, wherein the data driving part comprises:

a plurality of latches receiving and outputting the image data;

a plurality of first source switches and a plurality of second source switches sequentially transmit the image data outputted from the plurality of latches; and a plurality of digital analog converters converting the image data transmitted through the plurality of first source switches and the plurality of second source switches into the data voltage and sequentially outputting the data voltage.

7. The display device of claim 6, wherein the plurality of first source switches and the plurality of second source switches sequentially transmit the first red, second red, third red, fourth red, fifth red and sixth red image data to the first red digital analog converter, sequentially transmit the first green, second green, third green, fourth green, fifth green and sixth green image data to the first green digital analog converter, and sequentially transmit the first blue, second blue, third blue, fourth blue, fifth blue and sixth blue image data to the first blue digital analog converter.

8. The display device of claim 1, wherein each of the plurality of subpixels includes first to tenth transistors, a storage capacitor and a light emitting diode.

9. The display device of claim 1, further comprising a plurality of data lines receiving the data voltage and a plurality of gate lines receiving the gate voltage, wherein the plurality of data lines includes first, second, third, fourth, fifth and sixth data lines and the plurality of gate lines includes first, second and third gate lines, wherein the first red, first green, first blue, second red, second green and second blue subpixels are connected to the first, second, third, fourth, fifth and sixth data lines, respectively, and are connected to the first gate line, wherein the third red, third green, third blue, fourth red, fourth green and fourth blue subpixels are connected to the first, second, third, fourth, fifth and sixth data lines, respectively, and are connected to the second gate line, and wherein the fifth red, fifth green, fifth blue, sixth red, sixth green and sixth blue subpixels are connected to the first, second, third, fourth, fifth and sixth data lines, respectively, and are connected to the third gate line.

10. A display device comprising:

a timing controlling part generating an image data, a data control signal and a gate control signal;

a data driving part generating a data voltage using the image data and the data control signal;

a gate driving part generating a gate voltage by using the gate control signal;

a display panel including a plurality of subpixels and displaying an image by using the data voltage and the gate voltage; and a plurality of first MUX switches and a plurality of second MUX switches sequentially transmitting the data voltage to two of a same color among the plurality of subpixels, wherein the data driving part comprises:

a plurality of latches receiving and outputting the image data;

a plurality of first source switches and a plurality of second source switches sequentially transmit the image data outputted from the plurality of latches; and a plurality of digital analog converters converting the image data transmitted through the plurality of first source switches and the plurality of second source switches into the data voltage and sequentially outputting the data voltage, wherein the image data includes first red to sixth red image data, first green to sixth green image data and first blue to sixth blue image data, and wherein the plurality of digital analog converters include a first red digital analog converter receiving the first red to sixth red image data, a first green digital analog converter receiving the first green to sixth green image data and a first blue digital analog converter receiving the first blue to sixth blue image data.

11. The display device of claim 10, wherein the plurality of latches comprises:

a first latch receiving and sequentially outputting the first red, third red and fifth red image data;

a second latch receiving and sequentially outputting the second red, fourth red and sixth red image data;

a third latch receiving and sequentially outputting the first green, third green and fifth green image data;

a fourth latch receiving and sequentially outputting the second green, fourth green and sixth green image data;

a fifth latch receiving and sequentially outputting the first blue, third blue and fifth blue image data; and a sixth latch receiving and sequentially outputting the second blue, fourth blue and sixth blue image data.

12. The display device of claim 11, wherein the first red digital analog converter receives the first red, third red and fifth red image data of the first latch through the first source switch and receives the second red, fourth red and sixth red image data of the second latch through the second source switch, wherein the first green digital analog converter receives the first green, third green and fifth green image data of the third latch through the first source switch and receives the second green, fourth green and sixth green image data of the fourth latch through the second source switch, and wherein the first blue digital analog converter receives the first blue, third blue and fifth blue image data of the fifth latch through the first source switch and receives the second blue, fourth blue and sixth blue image data of the sixth latch through the second source switch.

13. A method of driving a display device, comprising: generating an image data, a data control signal and a gate control signal; generating a data voltage using the image data and the data control signal; generating a gate voltage using the gate control signal; sequentially transmitting the data voltage totwo of a same color among a plurality of subpixels through a plurality of first MUX switches and a plurality of second MUX switches; and displaying an image using the data voltage and the gate voltage wherein the data voltage includes first to sixth red data voltages, wherein the plurality of subpixels comprises: first red, first green, first blue, second red, second green and second blue subpixel sequentially arranged from a left to a right in a first horizontal pixel line; third red, third green, third blue, fourth red, fourth green and fourth blue subpixels sequentially arranged from a left to a right in a second horizontal pixel line; and fifth red, fifth green, fifth blue, sixth red, sixth green and sixth blue subpixels sequentially arranged from a left to a right in a third horizontal pixel line, and wherein the plurality of first MUX switches and the plurality of second MUX switches sequentially transmit the first red, second red, fourth red, third red, fifth red and sixth red data voltages to the first red, second red, fourth red, third red, fifth red and sixth red subpixels, respectively.

* * * * *